United States Patent
Yamada

[11] Patent Number: 5,667,854
[45] Date of Patent: Sep. 16, 1997

[54] RECTANGULAR OPTICAL COMPENSATORY SHEET, PROCESS FOR PREPARATION OF THE SAME, AND LIQUID CRYSTAL DISPLAY

[75] Inventor: Tsukasa Yamada, Kanagawa, Japan

[73] Assignee: Fuji Photo Film Co., Ltd., Minami-ashigara, Japan

[21] Appl. No.: 685,686

[22] Filed: Jul. 24, 1996

[30] Foreign Application Priority Data

Jul. 24, 1995 [JP] Japan ................... 7-186949

[51] Int. Cl.$^6$ ................... G02F 1/1335
[52] U.S. Cl. ................... 428/1; 427/162; 427/164; 349/118
[58] Field of Search ................... 428/1; 359/73, 359/76; 427/162, 164; 349/118

[56] References Cited

FOREIGN PATENT DOCUMENTS 646829  4/1995  European Pat. Off. .

Primary Examiner—Alexander Thomas
Attorney, Agent, or Firm—Burns, Doane, Swecker & Mathis, LLP

[57] ABSTRACT

Disclosed is a rectangular optical compensatory sheet having a shorter side of not less than 14 cm which comprises a transparent support, an orientation layer provided thereon and an optically anisotropic layer provided on the orientation layer, the optically anisotropic layer comprising a compound having one or more discotic structure units in its molecule, and whose variation of retardation in overall area is within X±5 nm wherein X is in the range of 0 to 100 nm, the retardation being represented by the formula: $(n_x-n_y) \times d$ in which $n_x$ and $n_y$ are main refractive indices on the plane of the sheet and d is the thickness of the sheet in terms of nm. Further, a liquid crystal display and a color liquid crystal display provided with the optical compensatory sheet are disclosed.

11 Claims, 6 Drawing Sheets

RECTANGULAR OPTICAL COMPENSATORY SHEET, PROCESS FOR PREPARATION OF THE SAME, AND LIQUID CRYSTAL DISPLAY

BACKGROUND OF THE INVENTION

1. Field of the Invention

The present invention relates to a rectangular optical compensatory sheet, a process for the preparation of the sheet, a liquid crystal display provided with the compensatory sheet, and a color liquid crystal display provided with the compensatory sheet.

2. Description of Prior Art

As a display for electronic office system-devices such as a desk-top personal computer and a word processor, CRT (cathode ray tube) has been employed so far. Recently, a liquid crystal display (hereinafter referred to as LCD) has been widely employed instead of the CRT, because of its small thickness, light weight and low power consumption. LCD generally has a structure that a liquid crystal cell is disposed between a pair of polarizing sheets. Most of LCD use a twisted nematic liquid crystal. Operational mode of LCD using the twisted nematic liquid crystal is roughly divided into a birefringence mode and an optical rotatory mode.

A super twisted nematic liquid crystal display (hereinafter referred to as STN-LCD) utilizing the birefringence mode uses a super twisted nematic liquid crystal which shows a twisted angle of more than 90 degrees and having steep electro-optical characteristics. Such STN-LCD, therefore, has an advantage of giving display of a large area by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, a twisted nematic liquid crystal showing a twisted angle of 90 degrees and having positive birefringence is employed for displaying an image. This is called LCD of an optically rotary mode (i.e., TN-LCD). TN-LCD display mode shows quick response (such as several tens of milliseconds) and high display contrast, and easily gives a black-white display of high contrast. Hence, the optical rotatory mode has a number of advantages compared with the birefringence mode or other modes. However, TN-LCD has disadvantages that color or contrast on display varies depending upon viewing angle to a liquid crystal display, and its display characteristics are not comparable to the display characteristics of CRT.

In order to improve the viewing angle characteristics (i.e. to enlarge the viewable angle), arrangement of a phase difference film (optical compensatory sheet) between a pair of polarizing plates and TN liquid crystal cell has been proposed by Japanese Patent Provisional Publications No. 4(1992)-229828 and No. 4(1992)-258923.

The optical compensatory sheets proposed in these Publications give no optical effect when a liquid crystal display is seen from the direction vertical to a screen of the display because phase difference in the direction perpendicular to a surface of the liquid crystal display is almost zero. However, the optical compensatory sheet serves for compensation of phase difference (depending upon wavelengths of light) that occurs when the liquid crystal display is viewed from oblique directions. The phase difference results in unfavorable viewing angle characteristics such as coloring and disappearance of displayed image in the oblique directions.

It is known that the optical compensatory sheet is needed to have negative birefringence for compensating positive birefringence of the twisted nematic liquid crystal and an inclined optic axis.

Japanese Patent Provisional Publication No. 6(1994)-75116 and EP0576304 A1 disclose an optical compensatory sheet having the negative birefringence and inclined optic axis. In more detail, the disclosed sheet is prepared by stretching a polymer such as polycarbonate or polyester and has the directions of the main refractive indices which are inclined from the normal of the sheet. To prepare the above sheet by the stretching treatment, extremely complicated treatments are required. Therefore an optical compensatory sheet of a large surface area cannot be easily prepared according to the disclosed process.

Also known is an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993)-215921 discloses the use of a birefringence plate (optical compensatory sheet) comprising a support and a polymerizable lod-like compound which shows the liquid crystal property and positive birefringence. The birefringence plate is prepared by coating a solution of the lod-like compound on the support and curing the compound under heating. However, the cured layer dose not show the negative birefringence. Hence, the resulting compensatory sheet scarcely enlarges the viewing angle from all directions.

Thus, the above known optical compensatory sheets comprising a support film, an orientation layer of the polymer and a liquid crystalline compound layer cannot greatly enlarge the viewing angle from all directions.

EP 646829 A1 discloses an optical compensatory sheet greatly enlarging the viewing angle from all directions. The optical compensatory sheet has a representative structure comprising a transparent support, an orientation layer such as a rubbed polyvinyl alcohol layer thereon, and an optically anisotropic layer of a discotic liquid crystalline compound provided on the orientation layer. The use of the discotic liquid crystalline compound is stated to bring about enlargement of the viewing angle.

In EP 646829 A1, the optically anisotropic layer is formed by coating a coating liquid of a discotic liquid crystalline compound in methyl ethyl ketone on the orientation layer, and heating to form a discotic nematic phase.

The present inventor has studied this process in detail from the viewpoint of industrial application, for instance, to prepare an optical compensatory sheet of a large size, and found that when an optically anisotropic layer of a large size is prepared by the above process, the resultant optical compensatory sheet shows wide variation in its retardation within the effective surface area. Such local variation of retardation is naturally disadvantageous.

SUMMARY OF THE INVENTION

It is an object of the present invention to provide a rectangular optical compensatory sheet of a relatively large size which gives an enlarged viewing angle and shows retardation having little variation in its effective image area.

It is another object of the invention to provide a process for the preparation of the optical compensatory sheet.

It is a further object of the invention to provide a liquid crystal display provided with the optical compensatory sheet which has an enlarged viewing angle and is almost free from reversion of black-and-white image or gradation.

It is a still further object of the invention to provide a color liquid crystal display provided with the optical compensatory sheet which gives an enlarged viewing angle and is almost free from reversion of black-and-white image or gradation.

There is provided by the invention a rectangular optical compensatory sheet having a shorter side of not less than 14 cm which comprises a transparent support, an orientation layer provided thereon and an optically anisotropic layer provided on the orientation layer, the optically anisotropic layer comprising a compound having one or more discotic structure units in its molecule, and whose variation of retardation in overall area is within X±5 nm wherein X is in the range of 0 to 100 nm, the retardation being represented by the formula:

(nx−ny)×d in which nx and ny are main refractive indices on the plane of the sheet and d is the thickness (nm).

The above retardation of the optical compensatory sheet corresponds to that when the sheet is viewed from the front side.

Preferred embodiments of the optical compensatory sheet according to the invention are as follows:

1) The rectangular optical compensatory sheet wherein the discotic structure units have planes inclined from a plane of the transparent support at angles varying along a direction of depth of the optically anisotropic layer.

3) The rectangular optical compensatory sheet wherein the shorter side has a size in the range of 14 to 150 cm.

4) The rectangular optical compensatory sheet wherein the side other the shorter side has a size in the range of 21 to 210 cm.

5) The rectangular optical compensatory sheet having the surface area is in the range of not less than 200 cm$^2$ (preferably 250 to 15,000 cm$^2$).

6) The rectangular optical compensatory sheet which has the minimum absolute retardation value in a direction inclined from the normal of the sheet, the minimum value being other than zero (i.e., the optically anisotropic layer has the minimum of absolute values of retardation values in a direction inclined from the normal of the sheet and has no optic axis).

7) The rectangular optical compensatory sheet in which the transparent support has a negative uniaxial property and its optic axis in a direction of the normal of the support, and satisfies the condition of:

$20 \leq \{(nx^1+ny^1)/2-nz^1\} \times d \leq 400$ in which $nx^1$ and $ny^1$ are main refractive indices on the plane of the support, $nz^1$ is a main refractive index in a thickness direction of the support and $d^1$ is the thickness of the support in terms of nm (preferably has a light transmittance of not less than 80%).

8) The rectangular optical compensatory sheet of which orientation layer is a polymer layer which has been subjected to rubbing treatment.

9) The rectangular optical compensatory sheet wherein the orientation layer is prepared by obliquely depositing an inorganic compound on the support.

The above rectangular optical compensatory sheet can be advantageously prepared by the steps of:

coating a coating liquid of a discotic compound in a solvent containing a liquid having a boiling point of not lower than 100° C. on an orientation layer which is provided on a continuous transparent support having a width of 15 to 150 cm and a length of 50 to 3,000 m, with moving the support in the length direction, by the use of a bar coater or extrusion coater, to form a coated layer;

drying the coated layer by applying a gas of a rate of 0.1 to 10 m/sec. and a temperature of 20° to 50° C. to the surface of the coated layer;

heating the coated layer to form a discotic nematic phase;

cooling the coated layer to give an optically anisotropic layer; and cutting the continuous transparent support having the orientation layer and the optically anisotropic layer to give a rectangular optical compensatory sheet having a shorter side of not less than 14 cm.

The rectangular optical compensatory sheet of the invention also can be prepared by the steps of:

coating a coating liquid of a discotic compound and fluorine atom- or silicon atom-containing surfactant in a solvent on an orientation layer which is provided on a continuous transparent support having a width of 15 to 150 cm and a length of 50 to 3,000 m, with moving the support in the length direction, by the use of a bar coater or extrusion coater, to form a coated layer;

drying the coated layer by applying a gas of a rate of 0.2 to 10 m/sec. and a temperature of 20° to 50° C. to a surface of the coated layer;

heating the coated layer to form a discotic nematic phase;

cooling the coated layer to give an optically anisotropic layer; and cutting the continuous transparent support having the orientation layer and the optically anisotropic layer to give a rectangular optical compensatory sheet having a shorter side of not less than 14 cm.

Preferred embodiments of the process according to the invention are as follows:

1) The process wherein as the liquid having a boiling point of not lower than 100° C., alcohol or ketone (preferably substituted with an alkoxy group) is employed.

2) The process wherein as the liquid having a boiling point of not lower than 100° C., one having a boiling point of 100° C. to 200° C. is employed.

There is also provided by the invention a rectangular optical compensatory sheet having a shorter side of not less than 14 cm which comprises an optically anisotropic layer comprising a compound having one or more discotic structure units in its molecule, and whose variation of retardation in overall area is within X±5 nm wherein X is in the range of 0 to 100 nm, the retardation being represented by the formula:

(nx−ny)×d in which nx and ny are main refractive indices on the plane of the sheet and d is the thickness of the sheet in terms of nm.

Further, there is provided by the invention a liquid crystal display comprising a liquid crystal cell which comprises a pair of substrates each of which is provided with a transparent electrode and a twisted nematic liquid crystal sealed therebetween, a polarizing sheet arranged on each side of the liquid crystal cell, and the above-mentioned optical compensatory sheet provided between at least one side of the liquid crystal cell and the polarizing sheet.

Furthermore, there is provided by the invention a color liquid crystal display comprising a liquid crystal cell which comprises a pair of substrates provided with a transparent electrode, a transparent electrode of picture element and color filter, and twist-oriented nematic liquid crystal sealed between the substrates, a pair of polarizing sheets arranged on both sides of the cell, and the above-mentioned optical compensatory sheet provided between the Preferred embodiments of the color liquid crystal display of the invention are as follows:

1) The color liquid crystal display wherein a pair of substrates mentioned above is composed of one substrate provided with a transparent electrode of a picture element and the other substrate provided with an opposite transparent electrode and color filter.

2) The color liquid crystal display described above 1) wherein the transparent electrode of picture element has TFT (thin-film-transistor) or MIM (metal-insulator-metal) element as non-linear active element.

3) The color liquid crystal display wherein the absorption axes of two polarizing plates meet at right angles and which is for normally white mode.

4) The color liquid crystal display wherein the absorption axes of two polarizing plates are parallel and which is for normally black mode.

The rectangular optical compensatory sheet of the invention has an optically anisotropic layer which comprises a compound having one or more discotic structure unit in its molecule, and shows retardation (corresponding to retardation obtained when the sheet is viewed from the front side) of little variation in a large surface area of rectangle having shorter side of not more than 14 cm. Therefore, the optical compensatory sheet shows, in a large area, uniform optical characteristics such as enlarged viewing angle.

Thus, by using the sheet, the liquid crystal display having a large display size and showing a greatly enlarged viewing angle can be obtained. Further, the color liquid crystal display having a large display size and showing a greatly enlarged viewing angle can be also obtained. In more detail, the color liquid crystal display provided with the optical compensatory sheet shows enlarged viewing angle in a color display by gradation and is improved in the viewing characteristics such as reversion of black-and-white image and gradation when the viewing direction to the liquid crystal display is greatly inclined from the normal to a surface of the screen, because the sheet is capable of almost completely compensating the phase difference.

DETAILED DESCRIPTION OF THE INVENTION

Figure 1:
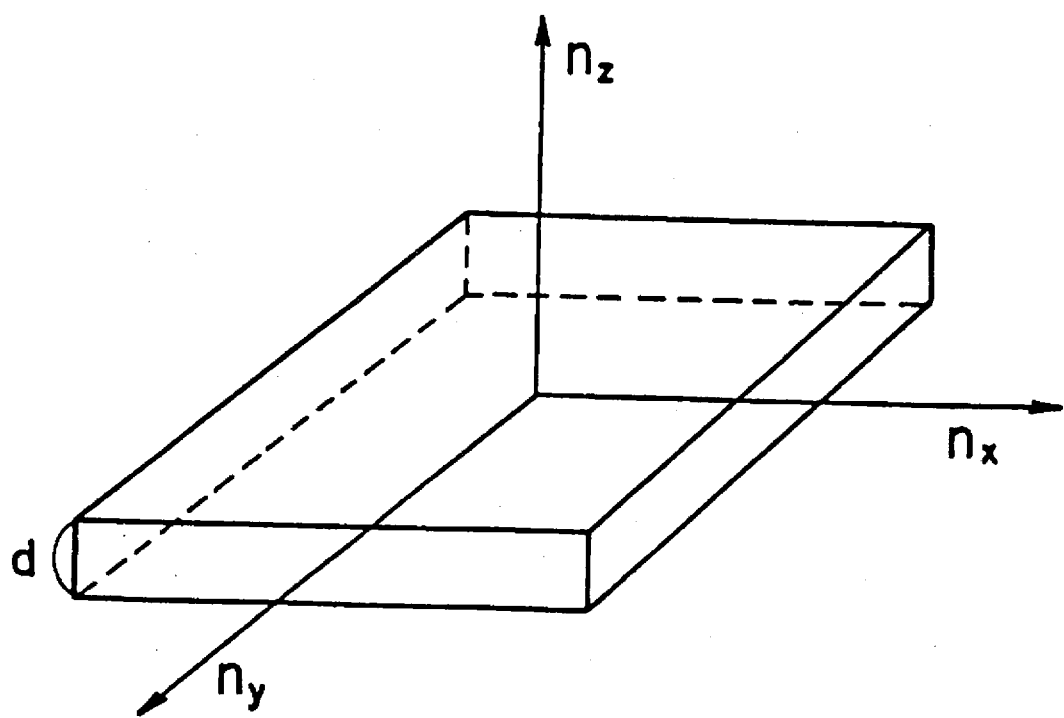
FIG. 1 is a view schematically showing the main refractive indices of the three axes of the rectangular optical compensatory sheet of the invention.

The rectangular optical compensatory sheet of the invention has an optically anisotropic layer comprising a compound having one or more discotic structure units in its molecule. The rectangular optical compensatory sheet generally comprises the optically anisotropic layer provided on an orientation layer which is provided on a transparent support. The rectangular optical compensatory sheet may consist of only optically anisotropic layer.

The rectangular optical compensatory sheet of the invention has an size having shorter side of not less than 14 cm. The shape of the optical compensatory sheet may be a square. In the invention, variation of the retardation of the optical compensatory sheet in the overall area is within $X\pm 5$ nm wherein X is in the range of 0 to 100 nm, the retardation being represented by the formula:

$$(nx-ny)\times d$$

in which nx and ny are main refractive indices on the plane of the sheet and d is the thickness of the sheet in terms of nm.

"nx", "ny" and "d" described above and "nz" are shown in FIG. 1. "nz" is a main refractive index in a thickness direction of the sheet.

X generally is in the range of 0 to 80 nm, preferably 10 to 60 nm and especially 20 to 40 nm. The retardation represented by the formula corresponds to that given when the sheet is viewed from the front side. Although the retardation does not show all optical characteristics of the optical compensatory sheet, it can show uniformity of its optical characteristics.

In the optical compensatory sheet, the optically anisotropic layer generally satisfies the condition of $0\leq(nx-ny)$; but the transparent support satisfies the condition of $0\leq(nx-ny)$ or $0>(nx-ny)$. Therefore, $(nx-ny)\times d$ of the optical compensatory sheet of the invention may show negative value so long as it satisfies the above condition.

The rectangular optical compensatory sheet preferably satisfies the condition of:

$$20\leq\{(nx+ny)/2-nz\}\times d\leq 400\ (nm)$$

in which nx, ny, nz and d have the same meanings as above especially satisfies the condition of:

$$20\leq\{(nx+ny)/2-nz\}\times d\leq 300\ (nm).$$

In the optical compensatory sheet, the shorter side preferably is in the range of 14 to 150 cm, and the side other than the shorter side (i.e., longer side) generally is not more than 21 cm and preferably in the range of 21 to 210 cm. The surface area of the rectangle generally is in the range of not less than 200 cm$^2$, preferably 250 to 15,000 cm$^2$.

The inventor has studied to obtain the above optical compensatory sheet having the retardation of little variation in the large area. As a result, it has been found that variation of the thickness of the optically anisotropic layer should be reduced to obtain the retardation of narrow variation in the large area, the variation of the thickness being produced in the drying procedure after an coating liquid for forming the optically anisotropic layer is coated on the orientation layer.

In more detail, if the rate or amount of a gas (e.g., air) employed for drying the coated layer is slightly varied in the drying procedure, a solvent contained in a coated layer is nonuniformly evaporated to make a temperature distribution of the surface of the coated layer nonuniform, whereby the surface tension and viscosity of the coated layer come to have nonuniform distributions which results in fluidization of the coated layer. The fluidization brings about disadvantageous variation of the thickness of the coated layer (optically anisotropic layer).

In order to obtain the rectangular optical compensatory sheet having the retardation of little variation in the large area, it is generally required to optimize the following conditions: (1) reduction of drying rate of the coated layer (e.g., addition of a solvent having a boiling point of not lower than 100° C.); (2) reduction of surface tension of the coated layer (e.g., addition of surfactant); (3) increase of viscosity of the coating liquid; (4) reduction of rate of a gas for drying; (5) increasing temperature for drying (which gives uniform drying).

For uniformly drying the coated layer without lowering the optical characteristics of the resultant optically anisotropic layer, means of the above (1) and (2) are especially effective.

The rectangular optical compensatory sheet having a front retardation (retardation given when it is viewed from the front side) of little variation in the large area can be, for example, prepared in the following manner. The preparation is explained referring to FIG. 2.

A continuous transparent support (film) having a polymer layer for orientation layer thereon is fed from a delivery roll (not illustrated), and the polymer layer is rubbed under running by two rubbing rolls to form an orientation layer. On the orientation layer of the continuous transparent support 14a under running, a coating liquid containing a discotic liquid crystalline compound is coated using a bar coater 11. The transparent support having the coated layer of the coated liquid 14b is moved along a rectifiable plate 12 to a drying zone 16, and then moved to a heating zone 19. In the heating zone 19, the discotic compound of the coated layer is oriented, and the coated layer is cured by application of UV radiation, if desired, and then cooled to form an optically anisotropic layer and wound up by a winding roll (machine, not shown). Thereafter, the continuous transparent support having the orientation layer and the optically anisotropic layer is cut to give the desired large sized rectangular optical compensatory sheet having a shorter side of not less than 14 cm.

In the drying process, a gas for drying is introduced into the drying zone 16 through a metallic netting 15a from an intake vent 13a. The gas introduced from an intake vent 13a is discharged at an exhaust vent 13b, and at the same time passed through the metallic netting 15a, a porous plate 18 and a metallic netting 15b to be discharged at a second exhaust vent 17.

In the drying zone 16, the rate of gas on the surface of the coated layer generally is in the range of 0.1 to 10 m/sec., preferably 0.2 to 10 m/sec., and especially 0.5 to 3 m/sec. The temperature generally is in the range of room temperature to 50° C., preferably 20° to 50° C. The running rate of the support generally is in the range of 5 to 30 m/min. The length (in the running direction of the support) of the drying zone 56 generally is in the range of 2 to 20 m. The whole length of the line for forming the optically anisotropic layer (length of the delivery roll to winding roll) generally is in the range of 20 to 80 m. The heating zone generally has a length of 10 to 50 m.

The support generally has a width of 15 to 150 cm (preferably 15 to 100 cm), and a length of 50 to 3,000 m (preferably 100 to 2,000 m).

The coating liquid containing a discotic compound (preferably, a discotic liquid crystalline compound) for forming the optically anisotropic layer is generally prepared by dissolving a discotic compound (further polymer and additives, if desired) in a solvent. As the solvent, a liquid having a boiling point of not lower than 100° C. is preferably employed.

Examples of the liquids include hydrocarbons such as nonane, decane, mesitylene and tetralin; halogenated hydrocarbons such as 1,2,3-trichloropropane, dichlorobenzene and bromobenzene; monohydric or polyhydric alcohols such as 1-butanol, 1-pentanol, 1-hexanol, 1-octanol, cyclohexanol, 1,2-ethanediol, glycerol, 1-methoxy-2-propanol, 1-ethoxy-2-propanol, 1-butoxyethoxy-2-propanol, 2-(2-methoxyethoxy)ethanol, 2-butoxyethanol, diacetonealcohol, 1,3-dichloropropanol and 2-aminoethanol; ethers such as anisole, diphenyl ether and diethylene glycol diethyl ether; phenols such as phenol and cresol; ketones such as 2-pentanone, 3-pentanone, 2-hexanone, 2-methyl-4-pentanone, 2-heptanone, 3-heptanone, 4-heptanone, acetonyl acetone, cyclohexanone and acetophenone; esters such as propyl acetate, butyl acetate, 2-butyl acetate, 2-ethylhexyl acetate, ethyl benzonate, dibutyl phthalate, 2-ethoxyethyl acetate, ethyl acetoacetate and 65-butyrolactone; nitrogen-containing compounds such as diethylenetriamine, formamide, acetoamide, $\epsilon$-caprolactam and 3-hydroxypropionitrile.

Preferred are alcohols and ketones, and especially those substituted with an alkoxy group are preferred. Alcohols substituted with an alkoxy group are especially preferred. The boiling point of the liquid generally is in the range of 100° C. to 270° C., preferably in the range of 100° C. to 200° C., and especially in the range of 100° C. to 150° C.

The amount of liquid having a boiling point of not lower than 100° C. incorporated into a coating liquid for forming the optically anisotropic layer depends on a boiling point of the used liquid or temperature for drying. In more detail, when the liquid having the boiling point is evaporated in the initial step of drying procedure, it cannot reduce nonuniform drying. In contrast, when the liquid remains in a large amount in the coated layer after the drying procedure, the resultant optically anisotropic layer contains the liquid in a significant amount to lower durability. The liquid having a boiling point of not lower than 100° C. is generally employed in an amount of 1 to 50 weight % based on a total amount of the solvent, preferably 1 to 30 weight %, and especially 1 to 20 weight %.

In order to obtain the optical compensatory sheet having the retardation of little variation in the large area, use of the surfactant (surface active agent) is effective as described above (2). As the surfactant, fluorine atom-containing surfactant or silicon atom-containing surfactant generally is employable. Any fluorine atom-containing surfactants and silicon atom-containing surfactants can be employed, so long as they are miscible with the solvent.

Examples of the fluorine atom-containing surfactants include salt of perfluoroalkyl sulfonate, perfluoroalkyl phosphoric acid ester, ethylene oxide adduct of perfluoroalkyl, salt of perfluoroalkyltrialkylammonium, salt of perfluoroalkylaminosulfonate, oligomer containing perfluoroalkyl group and lipophilic group, salt of partially fluorinated alkylsulfanate, partially-fluorinated alkylphosphoric acid ester, ethylene oxide adduct of partially-fluorinated alkyl, salt of partially-fluorinated alkyltrialkylammonium, salt of partially-fluorinated alkylaminosulfonate, and oligomer containing a partially-fluorinated alkyl group and lipophilic group.

Preferred examples of the fluorine atom-containing surfactants are set forth below:

  F-1

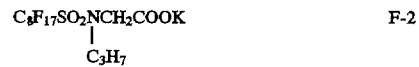  F-2

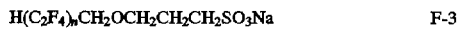  F-3 n = 5 to 25

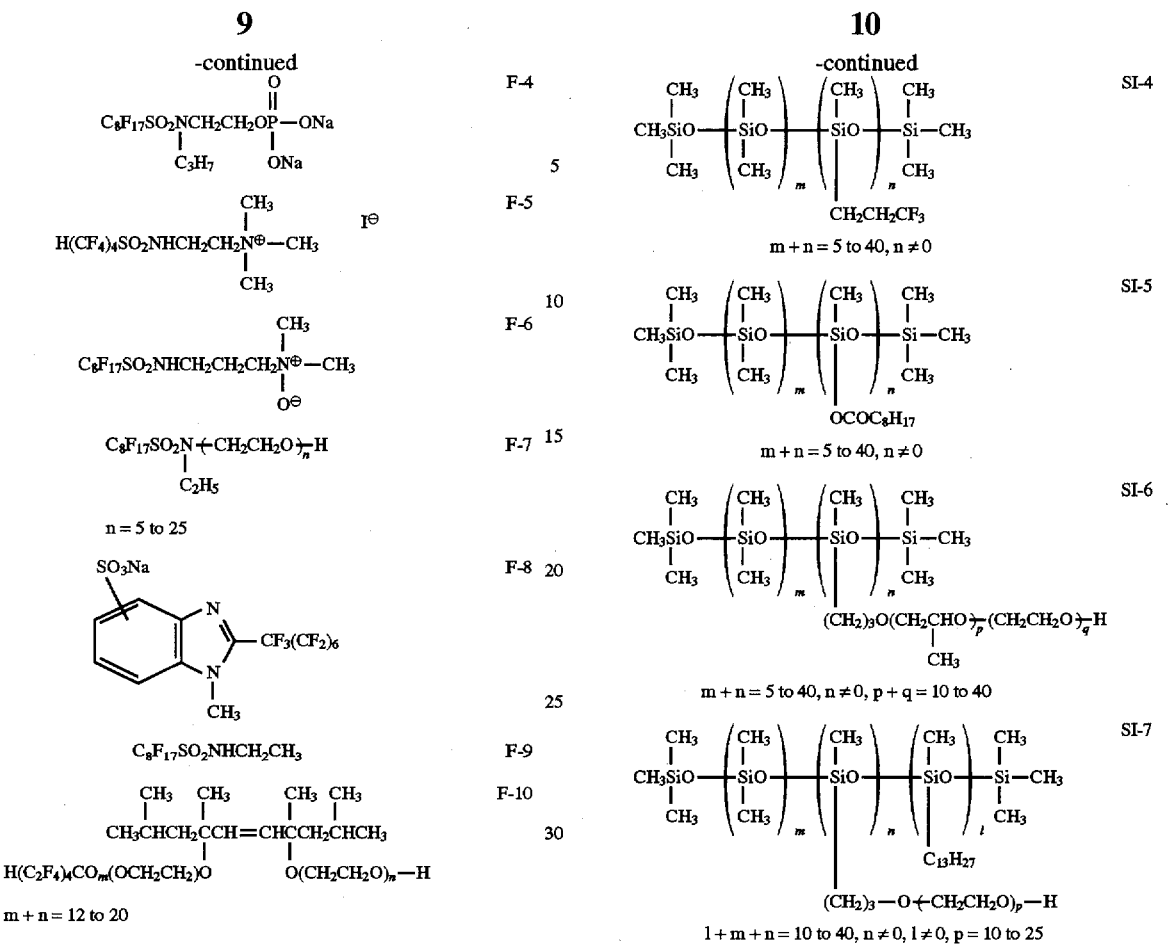

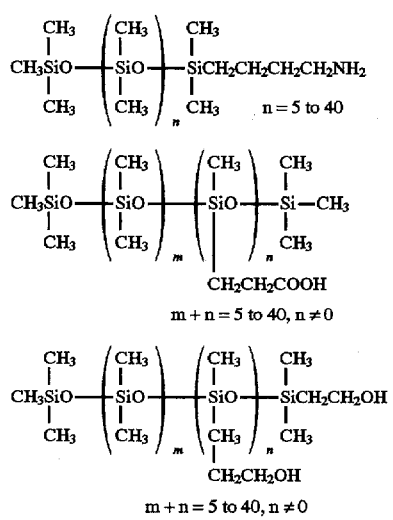

Examples of the silicon atom-containing surfactants (surfactants of organic silicon-containing compounds) include low-molecular weight dimethylsiloxanes, and low-molecular weight dimethylsiloxanes at their side chains or terminals having specific group (e.g., polyether group, alkyl group, fatty acid ester group, fluoroalkyl group, higher alkoxygroup, or methylstyryl group).

Preferred examples of the silicon atom-containing surfactants are set forth below:

When a large amount of the surfactant is employed in a coating liquid containing discotic compounds for forming the optically anisotropic layer, the surfactant tends to inhibit orientation of the discotic compounds because the surfactant moves the surface of the coated layer. Further, the use of the surfactant deteriorates durability. The use of the silicon atom-containing surfactant is effective compared with the use of fluorine atom-containing surfactant for reduction of nonuniform drying. Therefore, even a small amount of silicon containing surfactant is capable of giving great effect, as compared with the fluorine containing surfactant. The fluorine atom-containing surfactant is generally employed in an amount of 0.01 to 5 weight % based of the amount of the discotic compound, preferably 0.1 to 3 weight %, especially preferably 0.1 to 2 weight %. The silicon atom-containing surfactant is generally employed in an amount of 0.0005 to 5 weight % based of the amount of the discotic compound, preferably 0.001 to 2 weight %.

The optical compensatory sheet of the invention can be prepared by coating, on the orientation layer, the coating liquid of the discotic compound in a solvent containing the above specific liquid or of the discotic compound and the above specific surfactant in a solvent, drying the coated layer, and heating to the crystalline phase (e.g., discotic nematic phase) and then cool the layer.

Examples of the discotic compounds employed in the invention include the following compounds:

Examples of the compounds include benzene derivatives described in C. Destrade et al., Mol. Cryst. vol. 71, pp. 111, 1981, truxene derivatives described in C. Destrade et al., Mol Cryst. vol. 122, pp. 141. 1985, Physics lett. A, vol. 78, pp. 82, 1980, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp. 2655, 1994. The discotic compound generally has a structure that the basic structure of the above derivative is located at a center of the compound as a parent core and further straight chain groups such as alkyl, alkoxy and benzoyl having a substituent are radially bonded to the compound. The discotic compounds include discotic liquid crystalline compounds. As the discotic compounds, any compounds can be used, so long as the liquid crystals have a negative birefringence (negative uniaxial property) and orientation property, in the invention.

Preferred examples of the discotic liquid crystalline compounds employable in the invention are described below.

TE-1

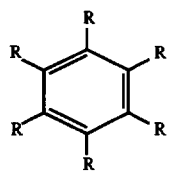

R: n—$C_{11}H_{23}$—$\overset{O}{\underset{\|}{C}}$—O—,

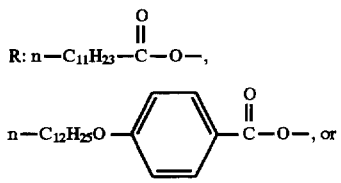

TE-2

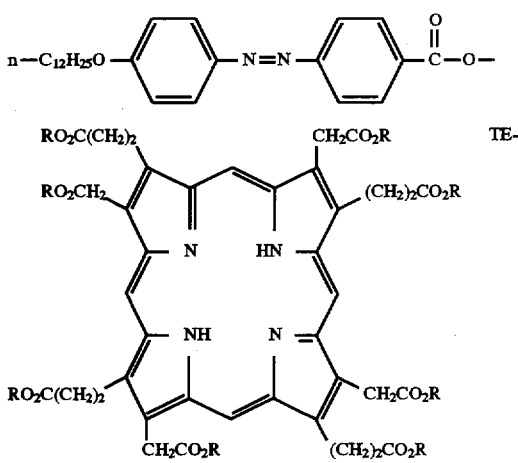

R: n—$C_{12}H_{25}$—

TE-3

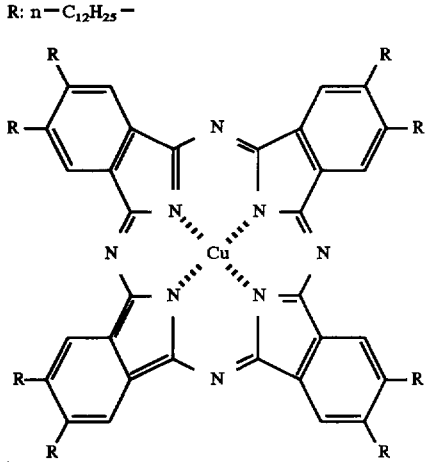

R: n—$C_{12}H_{25}OCH_2$—

TE-4

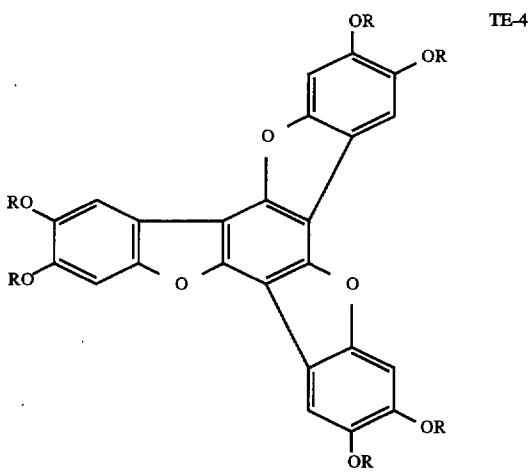

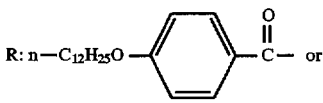

or n—$C_{13}H_{27}CO$—

TE-5

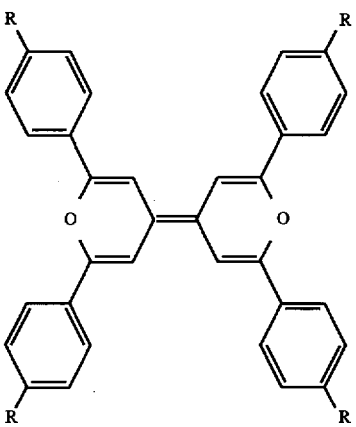

R: n—$C_{10}H_{21}$—

TE-6

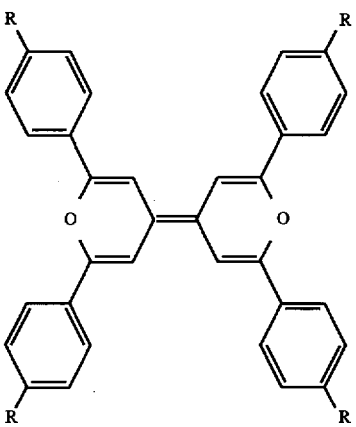

R: n—$C_8H_{17}$—

-continued
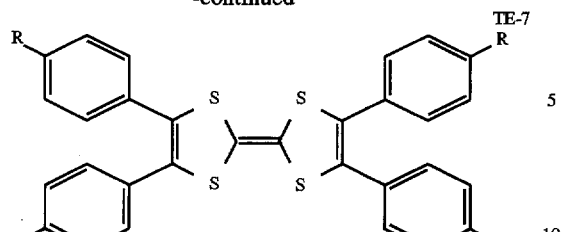
TE-7
R: n—C$_{16}$H$_{33}$O—
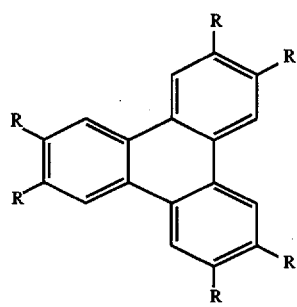
TE-8
R: (1)
n—C$_m$H$_{2m+1}$O—  (m = an integer of 2–15),
(2)
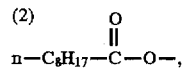
(3)
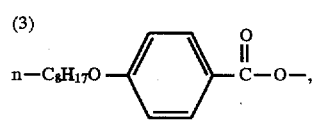
(4)
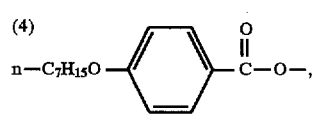
(5)
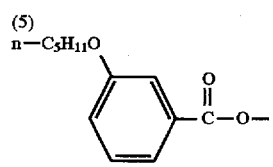
(6)
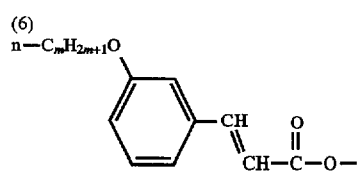
(m = an integer of 7–10),
(7)
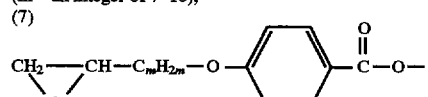
(m = an integer of 4–10), or
(8)
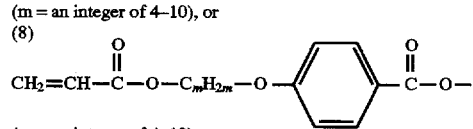
(m = an integer of 4–10)
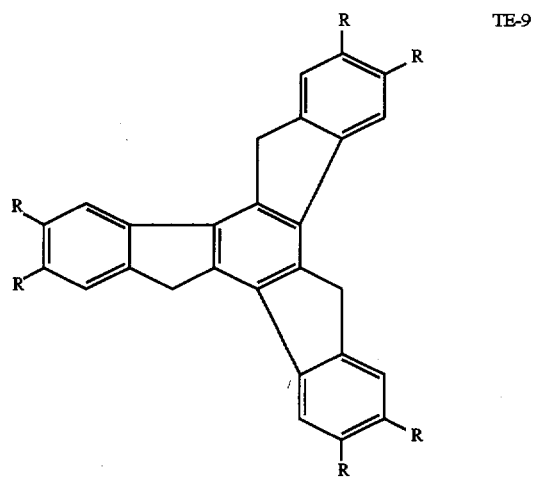
TE-9
R: (1)
n—C$_{10}$H$_{21}$C(=O)—O—,
(2)
n—C$_{16}$H$_{33}$O—⌬—C(=O)—O—, or
(3)
CH$_3$O—⌬—NHCO(CH$_2$)$_8$C(=O)—
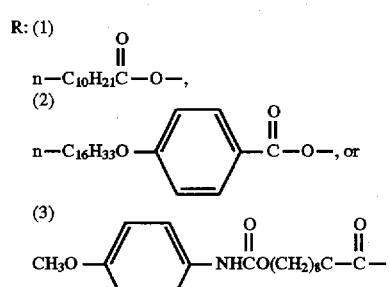
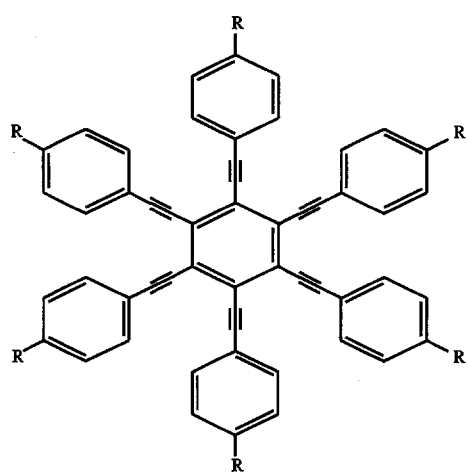
TE-10
R: C$_7$H$_{15}$O—
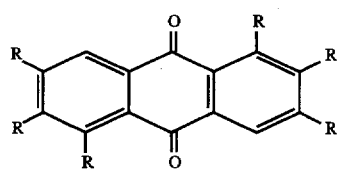
TE-11

R: (1)

or (2)

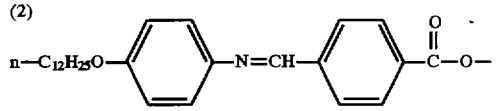

The optically anisotropic layer of the invention may be a layer of the discotic compound (e.g., the above compounds), or a layer obtained by polymerization or curing of one or more discotic compounds having a polymerizable group (e.g., the above compounds) or the discotic compound having a functional group (e.g., polymerizable group) and a monomer having a polymerizable group or other polymer. The layer of the polymerized discotic compound, which generally has no liquid crystalline property, has the orientation which show no change even under high temperature and humidity.

Examples of polymerizable groups of the discotic compounds having a functional group include polymerizable unsaturated bond (e.g., vinyl, acryloyl or methacryloyl), epoxy, hydroxyl, amino, or carboxyl. Examples of the polymerizations include radical polymerization using a compound having polymerizable unsaturated bond and heat- or photo-polymerization initiator, ring-opening polymerization using an epoxy compound and photo-oxygen-generating agent, and cross-linking reaction using a polyfunctional isocyanate compound or polyfunctional epoxy compound. In the polymerization, other compound having a functional group may be used together with the discotic compounds.

The optical compensatory sheet is preferably prepared by forming an orientation layer on a transparent support and forming an optically anisotropic layer on the orientation layer, as mentioned above.

The optically anisotropic layer is formed of a compound having a discotic structure unit as mentioned above, and the discotic structure unit generally has a plane inclined from a plane of the transparent support, preferably has a plane inclined from a plane of the optically anisotropic layer at an angle varying along a direction of depth of the optically anisotropic layer. The discotic structure unit is originated from the discotic liquid crystalline compound or polymer thereof.

The variation of the above angle (inclined angle) of the plane of discotic structure unit can be formed by the following treatments:

In a liquid crystal cell using a nematic liquid crystal, a liquid crystal layer is disposed between a pair of orientation layers which have been subjected to a rubbing treatment, whereby an optic axis of the nematic liquid crystal molecule is oriented in one direction. In more detail, the nematic liquid crystal molecule is uniformly oriented by force defining orientation which is given by the orientation layers on both side of the liquid crystal layer. Therefore, if the force defining orientations of the orientation layers are varied each other, orientation conditions of the nematic liquid crystal molecule are also changed. For example, inclined angles of the nematic liquid crystal molecules can be varied along a direction of depth of the liquid crystal layer.

The concept can be utilized for the optically anisotropic layer comprising the discotic compound.

The variation of the above angle (inclined angle) of the plane of discotic structure unit generally means increase or decrease with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area that the inclined angle does not vary in the course of the thickness direction of the layer. The inclined angle preferably totally increases or decreases in the layer, even if it does not vary locally. The inclined angle more preferably increases totally, and especially continuously increases.

Figure 3:
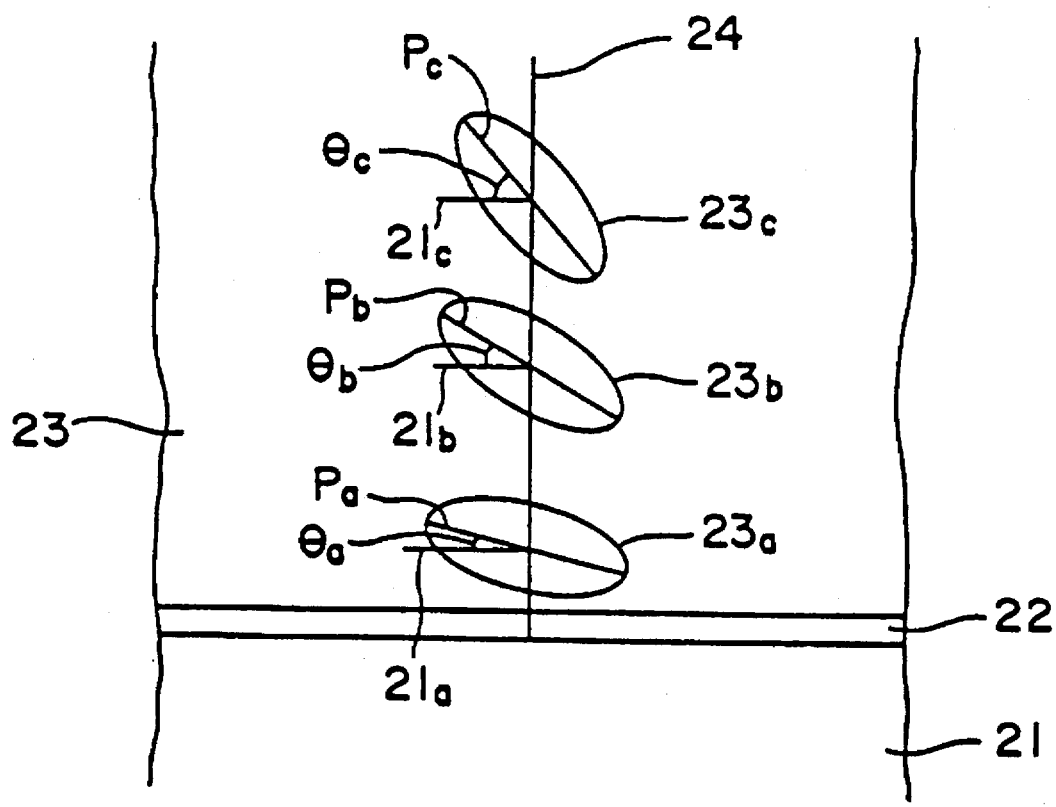
FIG. 3 is a view schematically showing a representative structure of the optically anisotropic layer of the invention.

The sectional view of the representative optically anisotropic layer of the invention is schematically shown in FIG. 3.

The optically anisotropic layer 23 is provided on the orientation layer 22 which is formed on the transparent support 21. The discotic liquid crystalline compounds 23a, 23b and 23c constituting the optically anisotropic layer 23 are arranged on the orientation layer 22 in such a manner that the planes of discotic structure units Pa, Pb and Pc, are inclined from planes 21a, 21b and 21c which are parallel to the plane of the transparent support 21 and at the inclined angles θa, θb and θc (angle between the plane of discotic structure unit and the plane of transparent support) increase, in order, with increase of distance in a direction of depth (thickness) from a bottom of the optically anisotropic layer. The reference number 24 is the normal of the transparent support.

The discotic liquid crystalline compound is a planar molecule, and therefore has only one plane (e.g., 21a, 21b, 21c) in the molecule when it is not polymerized.

The inclined angle generally varies within the range of 5 to 85 degree, preferably 5 to 80 degrees, and especially 5 to 50 degrees.

The above optically anisotropic layer can be generally prepared by coating a solution of the discotic compound and other compound in a solvent on the orientation layer, dried, heating to a temperature for forming a liquid crystalline phase such as a discotic nematic phase and cooling with keeping the oriented condition (discotic nematic phase). Otherwise, the layer can be prepared by coating a solution of a polymerizable discotic compound and other compound in a solvent on the orientation layer, drying, heating to a temperature for forming a liquid crystalline phase such as a discotic nematic phase, polymerizing the heated layer (e.g., by radiation of UV light) and cooling.

For example, the inclined angle of the discotic unit on the support side can be generally controlled by selection of discotic compounds or materials of the orientation layer, or selection of methods for rubbing treatment. The inclined angle of the discotic unit on a surface side (air side) can be controlled by selection of discotic compounds or other compounds (e.g., plasticizer, surfactant, polymerizable monomer and polymer) employed together with the discotic liquid crystalline compound. Further, the extent of variation of the inclined angle can be also controlled by the above selection.

As the plasticizers, surfactants or polymerizable monomers, any compounds can be employed so long as they are compatible with the discotic compound and have properties of giving variation of the inclined angle of the discotic compound or not inhibiting orientation of the discotic liquid crystalline compound. Preferred are polymerizable monomers (e.g., compounds having a vinyl, vinyloxy, acryloyl or methacryloyl group) because the expected polymerization of these monomers improves heat resistance. The compound are preferably used in an amount of 0.1 to 50 weight (especially 1 to 30 weight %) based on the amount of the discotic compound.

As examples of polymers, any polymers can be employed, so long as they are compatible with the discotic compound and are capable of giving variation of the inclined angle of the discotic compound. Preferred are cellulose esters. Examples of the cellulose esters include acetylcellulose, acetylpropionyl cellulose, hydroxypropyl cellulose, and acetylbutyryl cellulose. Preferred is acetylbutyryl cellulose. The polymers are generally used in an amount of 0.1 to 10 weight % (preferably 0.1 to 8.0 weight % and especially 0.1 to 5.0 weight %) based on the amount of the discotic compound, so as not to inhibit orientation of the discotic compound.

The solution for forming the optically anisotropic layer of the invention is generally prepared by dissolving the discotic compound(s) and other compounds described previously in a solvent (preferably containing a liquid having a boiling point of not lower than 100° C.).

Examples of solvents other than the liquids having the specific boiling point, include polar solvents such as pyridine, nonpolar solvents such as benzene and hexane, alkyl halides such as chloroform and dichloromethane, esters such as methyl acetate, ketones such as acetone and methyl ethyl ketone, and ethers such tetrahydrofuran and 1,2-dimethoxyethane. Preferred are alkyl halides and ketones.

Examples of the method for coating the above solution thereof includes a bar coating method, a curtain coating method, an extrusion coating method, a roll coating method, a dip coating method, a spin coating method, a print coating method, a coating method using slide coater, and a spray coating method.

As mentioned above, the optical compensatory sheet can be prepared by coating the coating solution on the orientation layer, heating the coated layer to a temperature of forming liquid crystalline phase such as discotic nematic phase (preferably in the range of 80° to 160° C.), further curing the layer by irradiation of UV light, if desired, and cooling the layer to room temperature.

As material of the transparent support (transparent film) on which the orientation layer is generally provided, any material can be employed, so long as it is transparent. The material preferably has a transmittance of not less than 80% and specially shows optical isotropy when it is viewed from a front side. Further, the film preferably has a negative uniaxial property and an optic axis in the normal line direction.

Therefore, the film is preferably prepared from material having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.). Moreover, materials having a large intrinsic birefringence such as polycarbonate, polyallylate, polysulfone and polyethersulfone can be also employed by rendering the materials optically isotropic by appropriately controlling molecular orientation in the procedure of forming a film.

The transparent film generally satisfies the condition of:
$$nz^1 < nx^1 = ny^1$$
and preferably satisfies the condition of:
$$20 \leq \{(nx^1+ny^1)/2-nz^1\} \times d^1 \leq 400 \text{ (nm)}$$
in which $nx^1$ and $ny^1$ are main refractive indices on the plane of the film, $nz^1$ is a main refractive index in a thickness direction of the film, and $d^1$ is a depth (i.e., thickness) direction of the film.

In practice, it is not required that $nx^1$ is exactly equal to $ny^1$, and it is a satisfactory condition that $nx^1$ is almost equal to $ny^1$. Therefore, the transparent film preferably satisfies the condition of:
$$|nx^1-ny^1|/|nx^1-nz^1| \leq 0.3$$
in which $nx^1$ and $ny^1$ have the same meanings as above and $d^1$ is a depth (i.e., thickness) direction of the film.

Further, "$|nx^1-ny^1| \times d^1$" of retardation from front side (when the display is viewed from the front side) preferably is not more than 50 nm, especially not more than 20 nm.

"$nx^1$", "$ny^1$", "$nz^1$" and "$d^1$" described above are in the same directions as "nx", "ny", "nz" and "d", respectively, shown in FIG. 1 as described previously.

The subbing layer is generally formed on the transparent support by a coating method after providing a surface activation treatment such as a chemical treatment, a mechanical treatment, a corona discharge treatment, a flame treatment, a UV treatment, a high frequency wave treatment, a glow discharge treatment, an active plasma treatment, and an ozone oxidation treatment (preferably a glow discharge treatment).

The subbing layer may further contain a surface active agent, an antistatic agent, and a pigment.

The orientation layer is generally provided on the transparent support or the above subbing layer. The orientation layer has a function of defining an orientation direction of a discotic compound to be provided thereon by a coating method, and the orientation gives an optic axis inclined from an optical compensatory sheet. As the orientation layer, any layers can be employed so long as they are capable of imparting orientation property to an optically anisotropic layer (layer of discotic compound). Preferred examples of the orientation layer include a layer of an organic compound (preferably polymer) subjected to rubbing treatment and an obliquely deposited layer of an inorganic compound.

Examples of polymers for the orientation layer include polyimide, polystyrene, polymer of styrene derivatives, gelatin, carboxymethyl cellulose, polyvinyl alcohol and polyvinyl alcohol having an alkyl group (preferably having 6 or more carbon atoms). Orientation layers obtained by subjecting films of these polymers to orientation treatment, are capable of tilting obliquely discotic compound.

The polyvinyl alcohol having an alkyl group is especially preferred from the viewpoint of uniform orientation of the discotic compound. It is presumed that interaction between the alkyl chain on the orientation layer and the discotic compound gives high orientation. The alkyl group of the polyvinyl alcohol is preferably present as a side or terminal group of the polyvinyl alcohol, and especially as a terminal group. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.). Further modified polyvinyl alcohols are preferred.

Preferred examples of the modified polyvinyl alcohols are described below:

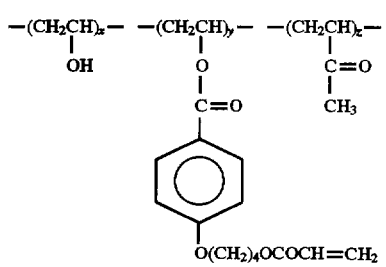
(1-1)

In the formula (1-1), examples of x, y and z are described below:

|  | x (molar %) | y (molar %) | z (molar %) |
|---|---|---|---|
| Polymer No. A | 87.8 | 0.2 | 12 |
| Polymer No. B | 87.997 | 0.003 | 12 |
| Polymer No. C | 87.86 | 0.14 | 12 |
| Polymer No. D | 87.94 | 0.06 | 12 |
| Polymer No. E | 86.9 | 1.1 | 12 |
| Polymer No. F | 98.5 | 0.5 | 1.0 |
| Polymer No. G | 97.8 | 0.2 | 2.0 |
| Polymer No. H | 96.5 | 2.5 | 1.0 |
| Polymer No. I | 94.9 | 4.1 | 1.0 |

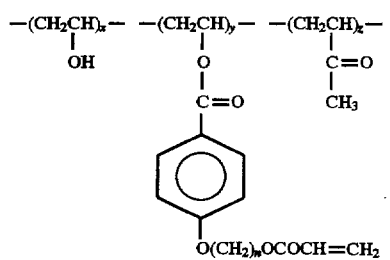
(1-2)

In the formula (1-2), examples of n, x, y and z are described below:

|  | n | x (molar %) | y (molar %) | z (molar %) |
|---|---|---|---|---|
| Polymer No. J | 3 | 87.8 | 0.2 | 12 |
| Polymer No. K | 5 | 87.85 | 0.15 | 12 |
| Polymer No. L | 6 | 87.7 | 0.3 | 12 |
| Polymer No. M | 8 | 87.7 | 0.3 | 12 |

Units of the recurring units of the following polymers are molar %.

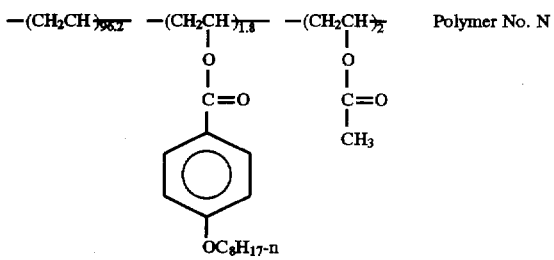
Polymer No. N

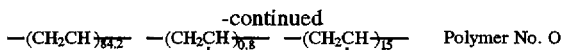
-continued

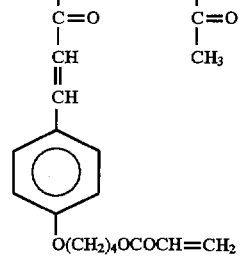
Polymer No. O

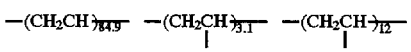

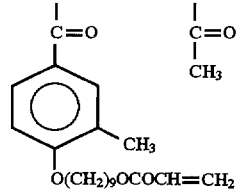
Polymer No. P

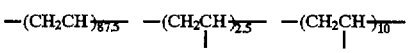

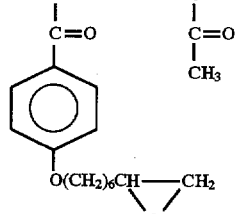
Polymer No. Q

In the formulae (1-1) and (1-2), y preferably is in the range of 0.001 to 20.0 molar %, especially in the range of 0.002 to 5.5 weight %. The modified polyvinyl alcohol can be used in combination with polymers employed for the known orientation layer.

A polyimide film (preferably fluorine atom-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the discotic compound (preferably discotic liquid crystalline compound) can be rubbed in the known manner which is conventionally employed to prepare an orientation layer or surface for liquid crystal of LCD. In more detail, the treatment is performed to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer in several times using cloth.

As the orientation layer, an obliquely deposited layer of an inorganic compound is also employable. Examples of the inorganic compounds include metal oxides or metal fluorides such as $SiO$, $TiO_2$, $MgF_2$ and $ZnO_2$ and metals such as Au and Al.

Other methods for orienting an optically anisotropic layer (layer of discotic liquid crystalline compound) without using the orientation layer, include those applying magnetic field or electric field to the layer provided on a support at desired angle under heating for forming discotic nematic phase.

Figure 4:
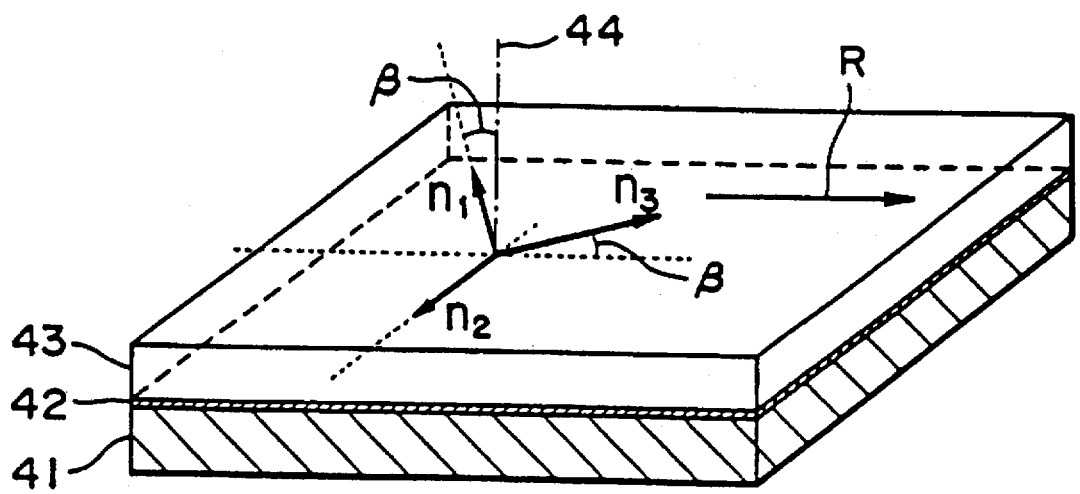
FIG. 4 is a view schematically showing the refractive indices of the three axes of the rectangular optical compensatory sheet of the invention.

The optical compensatory sheet generally has the minimum absolute retardation value in a direction inclined from the normal of the sheet and has no optic axis. The representative structure of the optical compensatory sheet containing the optically anisotropic layer of the invention is shown in FIG. 4. In FIG. 4, a transparent support 41, an orientation layer 42 and a layer of discotic liquid crystal 43 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $h_1$, $n_2$ and $n_3$ satisfy the condition of $n_1 \leq n_3 \leq n_2$, in the case that are seen in the front direction. The reference number $\beta$ is an inclined angle of the direction showing the minimum of Re from the normal 44 of the optically anisotropic layer.

In order to greatly improve the viewing angle characteristics of TN-LCD or TFT-LCD, the direction showing the minimum retardation value of the optically anisotropic layer is preferably inclined at 5 to 50 degrees from a normal line of the sheet ($\beta$ in FIG. 4) and especially 10 to 40 degrees.

Further, it is preferred that the sheet satisfies the condition of:

$50 \leq [(n_3+n_2)/2-n_1] \times D \leq 400$ (nm)

in which D is a thickness of the sheet; and especially the condition of:

$100 \leq [(n_3+n_2)/2-n_1] \times D \leq 400$ (nm)

In the optical compensatory sheet of the invention, "Dispersion" depending on wavelength generally equals to that of the liquid crystal cell because the optical compensatory sheet compensates birefringence of the liquid crystal cell. For example, $R_{450}/R_{550}$ (Dispersion) preferably is not less than 1.0, in which $R_{450}$ represents retardation of the sheet to light of 450 nm and $R_{550}$ represents retardation of the sheet to light of 550 nm.

Figure 5:
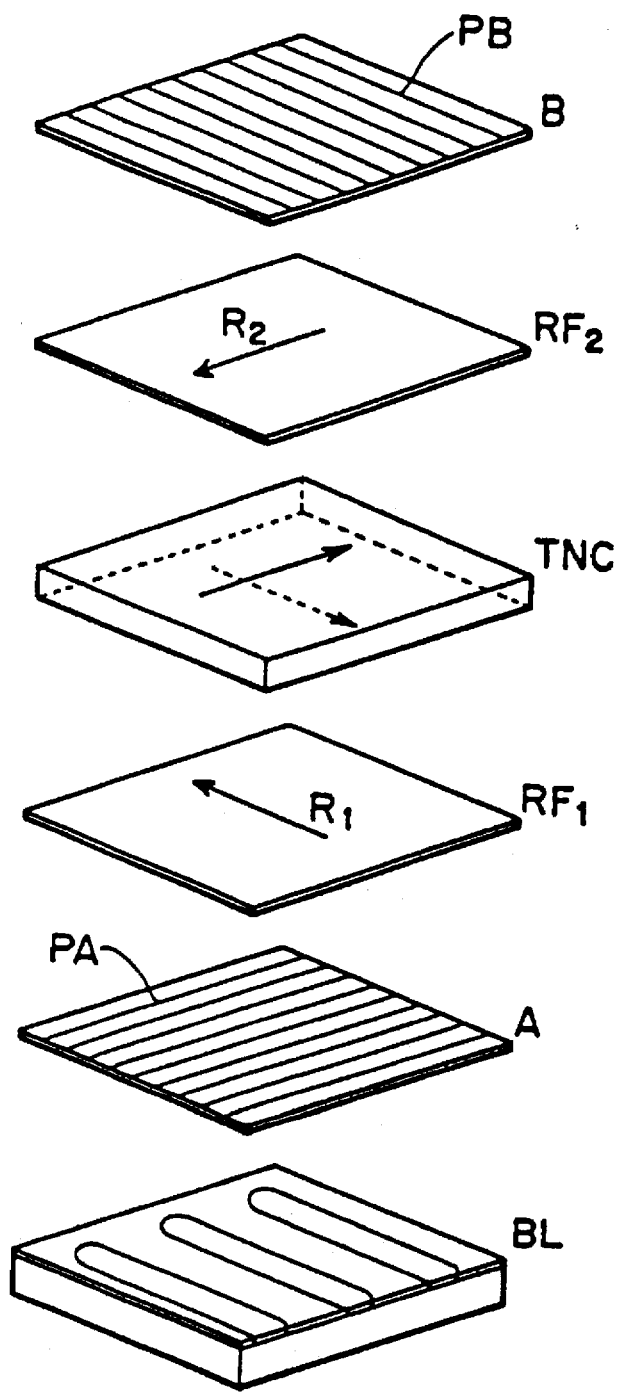
FIG. 5 is a view schematically showing a representative structure of the liquid crystal display of the invention.

The representative structure of the liquid crystal display of the invention is shown in FIG. 5. In FIG. 5, a liquid crystal cell TNC comprising a pair of substrates provided with a transparent electrode and a twist-oriented nematic liquid crystal sealed therebetween, a pair of polarizing plates A and B arranged on the both sides of the cell, the optical compensatory sheets RF1 and RF2 between the liquid crystal cell and the polarizing sheet and back light BL are assembled to constitute the liquid crystal display. The optical compensatory sheet may be placed only on one side (i.e., use of one of RF1 and RF2). The reference number R1 is a rubbing direction of the orientation layer of the optical compensatory sheet RF1, and the reference number R2 is the rubbing direction of the orientation layer of the optical compensatory sheet RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

Figure 6:
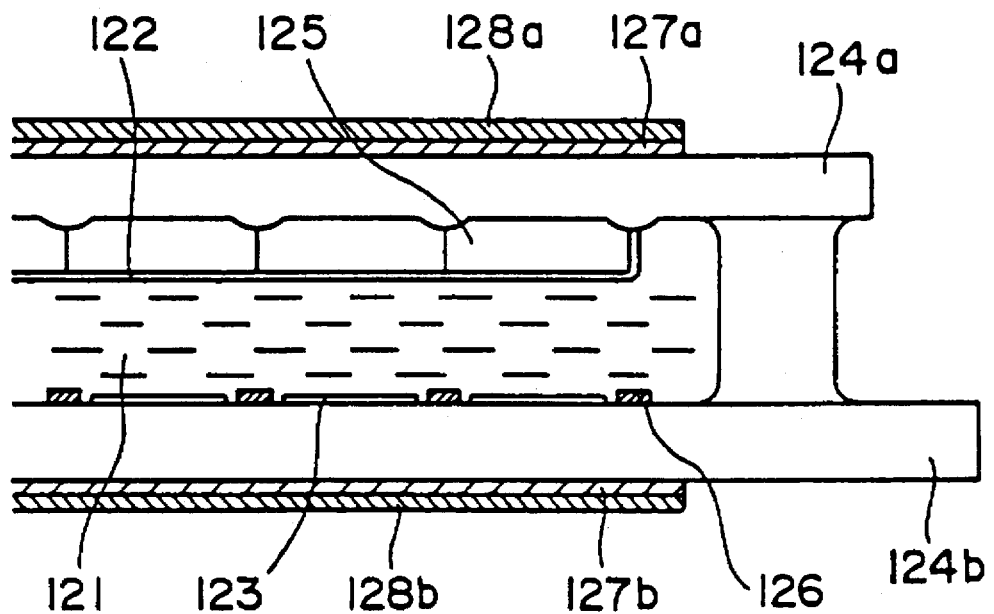
FIG. 6 is a sectional view schematically showing a representative structure of the color liquid crystal display of the invention.

Further, the representative structure of the color liquid crystal display of the invention is shown in FIG. 6. In FIG. 6, a liquid crystal cell comprising a glass substrate 124a provided with an opposite transparent electrode 122 and color filter 125, a glass substrate 124b provided with an electrode for picture element 123 and TFT (thin-film-transistor) 126, and twist-oriented nematic liquid crystal 121 sealed between the substrates, a pair of polarizing plates 128a and 128b arranged on both sides of the cell, and a pair of optical compensatory sheets 127a and 127b provided between the liquid crystal cell and the polarizing plate are assembled to constitute the color liquid crystal display. The optical compensatory sheet may be arranged only on one side (i.e., use of one of 128a and 128b).

As the color filter, any color filter can be utilized so long as it has high purity of hue, precise dimension and good heat-resistance. Examples of the color filter include a dyed filter, a printed filter, an electro-deposited filter and a pigment-dispersed filter, which are described in Color Liquid Crystal Display (Syunsuke Kobayashi, pp. 172–173 and pp. 237–251, Sangaku Tosho, 1990), and Flat Panel Display 1994 (Edited by Nikkei Microdevice, pp. 216, Nikkei BP Corporation). The dyed filter can be, for example, prepared by adding a dichromate to a substrate such as gelatin, casein or polyvinyl alcohol to give the substrate photosensitive property, forming a pattern on the photosensitive substrate by photolithography and dyeing.

Preferred examples of the twist-oriented nematic liquid crystals include nematic liquid crystals described in Handbook of Liquid Crystal Device (Edited by No. 142 Commission of Japan Society for the Promotion of Science, pp. 107–213, Nikkan Kogyo Newspaper Office).

The long axis of the nematic liquid crystal is twisted at approx. 90 degrees and oriented between both substrates of the liquid crystal cell. Therefore, a linearly polarized light incident upon the liquid crystal cell is passed through the cell to become a light having polarized direction changed by 90 degrees due to optical rotatory power of the cell, when no voltage is applied to the cell. When high voltage of not less than threshold value is applied to the cell, the direction of the long axis of the nematic liquid crystal is changed to that of the applied voltage and the long axis is arranged perpendicular to the surface of substrate (electrode), whereby the optical rotatory power disappears.

To obtain an effective (in high contrast) response by the optical rotatory power, the twisted angle preferably is in the range of 70 to 100 degrees, especially 80 to 90 degrees.

Further, it is preferred that the liquid crystal molecule is pre-tilted to give a pre-tilted angle in order to depress occurrence of disclination in the condition of the application of voltage. The pre-tilted angle preferably is not more than 5 degrees, especially in the range of 2 to 4 degrees. Details of the twisted-angel and pre-tilted angel are shown in Application Edition of Liquid Crystal (Mitsuji Okano and Syunsuke Kobayashi, pp. 16–28, Baifukan).

The product ($\Delta n \cdot d$) of refractive index anisotropy (birefringence) of the liquid crystal cell ($\Delta n$) and a thickness of the liquid crystal layer of the cell (d) preferably is in the range of 300 to 1,000 nm, especially 300 to 600 nm. Details of the product ($\Delta n \cdot d$) are described in Handbook of Liquid Crystal Device (Edited by No. 142 Commission of Japan Society for the Promotion of Science, pp. 329–337, Nikkan Kogyo Newspaper Office).

Signals utilized in the color liquid crystal display of the invention, is preferably composed of alternating current of 5 to 100 Hz and voltage of not more than 20V (especially not more than 8V). In a normally white mode, bright display is usually conducted in 0 to 1.5V, a medium contrast display is usually done in 1.5 to 3.0V, and a dark display is usually conducted in 3.0V and more. Details of the signals are described in Handbook of Liquid Crystal Device (Edited by No. 142 Commission of Japan Society for the Promotion of Science, pp. 387–465, Nikkan Kogyo Newspaper Office) and Application Edition of Liquid Crystal (Mitsuji Okano and Syunsuke Kobayashi, pp. 85–105, Baifukan).

Examples of the present invention and comparison examples are given below, but these examples by no means restrict the invention.

EXAMPLE 1

Formation of Orientation Layer

On a triacetyl cellulose film having a thickness of 100 μm (width: 36 cm, length: 1,000 m, available from Fuji Photo Film Co., Ltd.), a thin layer of gelatin (0.1 μm) was formed. "{($nx^1+ny^1$)/2−$nz^1$}×$d^1$" of the triacetyl cellulose film was 45 nm. Thus, the film had almost negative uniaxial property and the optic axis almost was coincident with the direction of the normal of the film.

The following coating solution for forming an orientation layer was coated on the gelatin layer using an extrusion coater. The coating was conducted with moving the triacetyl cellulose film at a rate of 30 m/min., and then dried bypassing the film through a drying zone (temperature: 90° C., pass length: 60 m) with moving the film at the same rate, to form a crosslinked polymer layer having a thickness of 0.5 μm.

| [Coating solution for forming orientation layer] | |
|---|---|
| Modified polyvinyl alcohol (previously mentioned polymer No. A) | 1,000 g |
| Water | 37,000 g |
| Methanol | 11,900 g |
| Glutaraldehyde (50 wt. % aqueous solution) | 100 g |

A surface of the resultant crosslinked polymer layer was subjected to rubbing treatment with moving the triacetyl cellulose film at a speed of 20 m/min. The rubbing treatment was conducted using a rubbing roller (outer diameter of 150 mm) in the conditions of the number of revolution of the rubbing roller of 1,200 rpm, and the tension for conveying the support of 4 kgf/cm, whereby an orientation layer was formed.

Formation of Optically Anisotropic Layer

Figure 2:
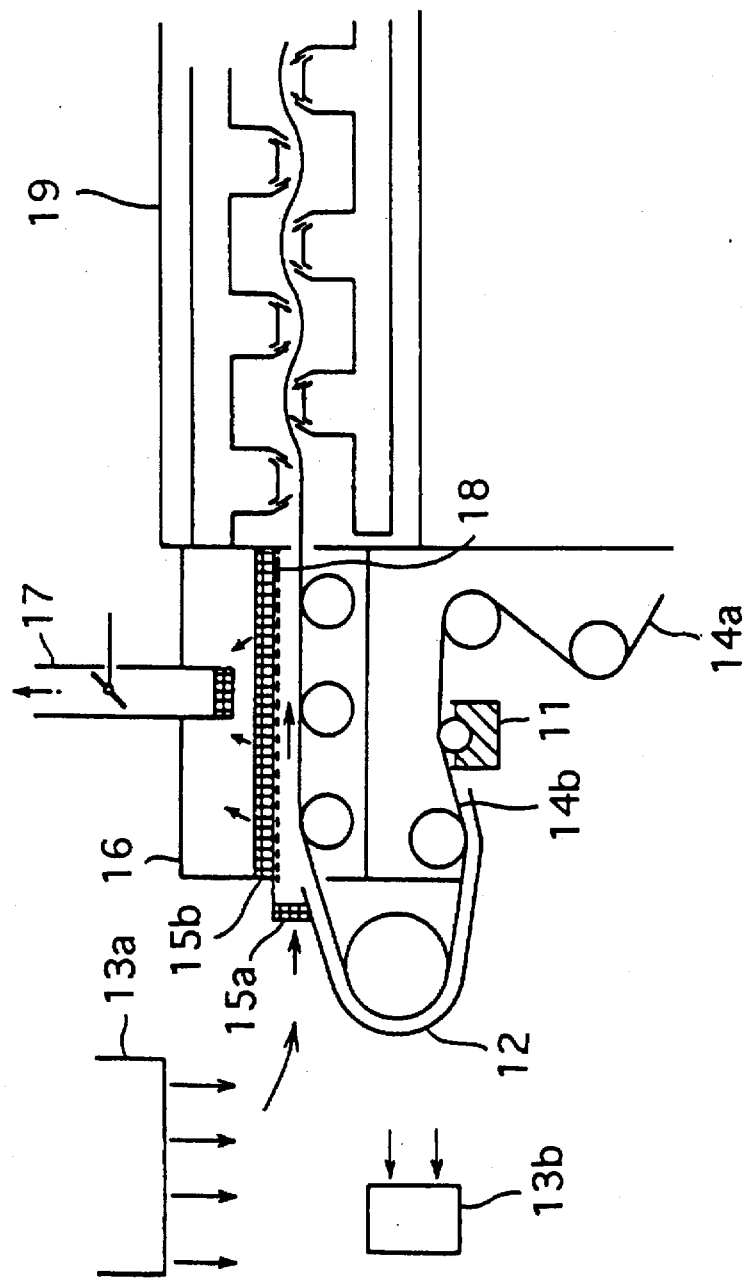
FIG. 2 is a view for explaining the process for the preparation of the rectangular optical compensatory sheet of the invention.

The formation was performed using the line for forming an optically anisotropic layer shown in FIG. 2.

After the rubbing treatment, the following coating solution was continuously coated within 300 mm width in a coating amount of 5.2 cc/m$^2$ on the orientation layer by the use of an wire-bar coater with moving the triacetyl cellulose film at a speed of 20 m/min.

| [Coating solution for forming optically anisotropic layer] | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.), | 40 g |
| Photopolymerization initiator (Irgacure-907, available from Ciba-Geigy) | 60 g |
| Sensitizer (Kayacure-DETX, available from Nippon Kayaku Co., Ltd.) | 20 g |
| Diacetonealcohol (b.p.: 168° C.) | 340 g |
| Methyl ethyl ketone (b.p.: 80° C.) | 3,090 g |

Subsequently, the triacetyl cellulose film having the coated layer was passed through a drying zone (*wind velocity: 1.0 m/sec., temperature: 25° C., length of the zone: 5 m) at a rate of movement of 20 m/min. to dry the coated layer, and continuously the coated layer was passed through a heating zone for orientation (temperature: 120° C., length of the zone: 25 m) to orient the discotic compound.

Subsequently, the coated layer was passed through a UV. zone at a rate of movement of 20 m/min. to be exposed to UV light (a high-pressure mercury lamp (120W/cm) in intensity of illumination of 600 mW/cm$^2$) for one second under heating at 120° C. and cooled to room temperature to form an optically anisotropic layer having a thickness of 1.9 μm. The film (width: 360 mm, length: 1,000 m) having the orientation layer and the optically anisotropic layer was wound up by a winding roll. Thus, an optical compensatory sheet (RF-1) in the form of roll, which comprises a transparent support, an orientation layer and an optically anisotropic layer, was obtained.

*The wind velocity was measured by a heat-wire anemometer (Type 24-6131; available from Canomax Co., Ltd,) placed at the position of 10 mm from the surface of the coated layer.

EXAMPLE 2

The procedures of Example 1 were repeated except for using the following composition as a composition of the coating solution for forming optically anisotropic layer, to prepare an optical compensatory sheet (RF-2).

| [Composition of coating solution for forming optically anisotropic layer] | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.), | 40 g |
| Photopolymerization initiator (Irgacure-907, available from Ciba-Geigy) | 60 g |
| Sensitizer (Kayacure-DETX, available from Nippon Kayaku Co., Ltd.) | 20 g |
| 2-Methyl-4-pentanone (b.p.: 116° C.) | 340 g |
| Methyl ethyl ketone (b.p.: 80° C.) | 3,090 g |

EXAMPLE 3

The procedures of Example 1 were repeated except for using the following composition as a composition of the coating solution for forming optically anisotropic layer, to prepare an optical compensatory sheet (RF-3).

| [Composition of coating solution for forming optically anisotropic layer] | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.) | 40 g |
| Acetylbutyrylcellulose (CAB531-1, available from Eastman Chemical Co.) | 10 g |
| Photopolymerization initiator (Irgacure-907, available from Ciba-Geigy) | 60 g |
| Sensitizer (Kayacure-DETX, available from Nippon Kayaku Co., Ltd.) | 20 g |
| 1-Methoxy-2-propanol (b.p.: 120° C.) | 175 g |
| Methyl ethyl ketone (b.p.: 80° C.) | 3,270 g |

EXAMPLE 4

The procedures of Example 1 were repeated except for using the following composition as a composition of the coating solution for forming optically anisotropic layer, to prepare an optical compensatory sheet (RF-4).

[Composition of coating solution for forming optically anisotropic layer]

| | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.) | 40 g |
| Acetylbutyrylcellulose (CAB531-1, available from Eastman Chemical Co.) | 10 g |
| Photopolymerization initiator (Irgacure-907, available from Ciba-Geigy) | 60 g |
| Sensitizer (Kayacure-DETX, available from Nippon Kayaku Co., Ltd.) | 20 g |
| Isopropylacetate (b.p.: 89° C.) | 445 g |
| 1-Methoxy-2-propanol (b.p.: 120° C.) | 70 g |
| Methyl ethyl ketone (b.p.: 80° C.) | 2,915 g |

EXAMPLE 5

The procedures of Example 1 were repeated except for using the following composition as a composition of the coating solution for forming optically anisotropic layer, to prepare an optical compensatory sheet (RF-5).

[Composition of coating solution for forming optically anisotropic layer]

| | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.) | 40 g |
| Acetylbutyrylcellulose (CAB531-1, available from Eastman Chemical Co.) | 10 g |
| Photopolymerization initiator (Irgacure-907, available from Ciba-Geigy) | 60 g |
| Sensitizer (Kayacure-DETX, available from Nippon Kayaku Co., Ltd.) | 20 g |
| Acetone (b.p.: 56° C.) | 310 g |
| 1-Methoxy-2-propanol (b.p.: 120° C.) | 345 g |
| Methyl ethyl ketone (b.p.: 80° C.) | 2,790 g |

EXAMPLE 6

The procedures of Example 1 were repeated except for using the following composition as a composition of the coating solution for forming optically anisotropic layer, to prepare an optical compensatory sheet (RF-6).

[Composition of coating solution for forming optically anisotropic layer]

| | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.) | 40 g |
| Photopolymerization initiator (Irgacure-901, available from Ciba-Geigy) | 60 g |
| Sensitizer (Kayacure-DETX, available from Nippon Kayaku Co., Ltd.) | 20 g |
| Fluorine containing surfactant (F-7 (n = 15), above mentioned compound) | 40 g |
| Methyl ethyl ketone (b.p.: 80° C.) | 3,430 g |

EXAMPLE 7

The procedures of Example 1 were repeated except for using the following composition as a composition of the coating solution for forming optically anisotropic layer, to prepare an optical compensatory sheet (RF-7).

[Composition of coating solution for forming optically anisotropic layer]

| | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.) | 40 g |
| Photopolymerization initiator (Irgacure-907, available from Ciba-Geigy) | 60 g |
| Sensitizer (Kayacure-DETX, available from Nippon Kayaku Co., Ltd.) | 20 g |
| Silicon containing surfactant (SI-6 (m = 22, n = 3, p = 10, q = 5.5), above mentioned compound) | 5 g |
| Methyl ethyl ketone (b.p.: 80° C.) | 3,430 g |

COMPARISON EXAMPLE 1

The procedures of Example 1 were repeated except for using the following composition as a composition of the coating solution for forming optically anisotropic layer, to prepare an optical compensatory sheet (RF-8).

[Composition of coating solution for forming optically anisotropic layer]

| | |
|---|---|
| Discotic liquid crystalline compound (TE-8-(8, m = 4); compound previously mentioned) | 1,820 g |
| Ethylene glycol modified-trimethylol propane triacrylate (V#360, available from Shin Osaka Organic Chemical Industry Co., Ltd.) | 180 g |
| Acetylbutyrylcellulose (CAB551-0.2, available from Eastman Chemical Co.) | 40 g |
| Photopolymerization initiator (Irgacure-907, available from Ciba-Geigy) | 60 g |
| Sensitizer (Kayacure-DETX, available from Nippon Kayaku Co., Ltd.) | 20 g |
| Methyl ethyl ketone (b.p.: 80° C.) | 3,430 g |

[Evaluation of Optical Compensatory Sheet]

As for the continuous optical compensatory sheets obtained in Examples 1 to 7 and Comparison Example 1, the optical characteristics were evaluated in the manners described below.

(1) Variation of retardation

The continuous optical compensatory sheet was cut to a size of 30×30 cm (area having the optically anisotropic layer) to prepare a test piece.

Re value "(nx−ny)×d" when the test piece of sheet is viewed from the front side of the test piece was measured at 20 points, in which nx and ny are main refractive indices within the sheet, and d is a thickness of the sheet (FIG. 1).

The Re value was measuredby an ellipsometer (AEP-100, available from Shimadzu Seisakusho, Ltd.). The variation of the retardations was represented by the center value and maximum and minimum values of "(nx+ny)×d" which were determined based on the Re values at the 20 points.

(2) Angle (β) of direction showing the minimum retardation value

The thickness of the sheet was measured with a micrometer, and Re values when the sheet is viewed from various directions were measured by an ellipsometer (AEP-100, available from Shimadzu Seisakusho, Ltd.) to determine angle (β) of direction showing the minimum retardation value of the optical compensatory sheet.

The obtained results were set forth in Table 1.

TABLE 1

| Example | Sheet No. | *Optic Axis | Fluctuation of Re (nm) | Angle (β) of **Minimum (degree) |
| --- | --- | --- | --- | --- |
| Ex. 1 | RF-1 | None | 35 ± 3 | 24 |
| Ex. 2 | RF-2 | None | 36 ± 3 | 25 |
| Ex. 3 | RF-3 | None | 34 ± 3 | 23 |
| Ex. 4 | RF-4 | None | 34 ± 3 | 23 |
| Ex. 5 | RF-5 | None | 35 ± 3 | 24 |
| Ex. 6 | RF-6 | None | 37 ± 3 | 26 |
| Ex. 7 | RF-7 | None | 35 ± 3 | 24 |
| Co. Ex. 1 | RF-8 | None | 34 ± 6 | 23 |

Note:
*Direction showing Re of zero
**Direction showing retardation value of the minimum.

(3) Resistance to moist heat

The test piece was stuck to a glass plate in such a manner that the optically anisotropic layer is in contact with the surface of the glass plate. The composite was allowed to stand under the conditions of 70° C. and 95% RH (relative humidity) for 100 hours, and variation of the surface shape and the optical characteristics of the test sample were observed.

As a result, all the test samples obtained in the Examples 1-7 and Comparison Example 1 showed no variation of the appearance and the optical characteristics.

EXAMPLE 8

Preparation of Liquid Crystal Display

From a TFT-type color liquid crystal television (6E-C3, available from Sharp Corporation), the polarizing plates were removed. An optical compensatory sheet (RF-1) obtained in Example 1 were fixed on both sides of the television, and each of the polarizing plates was attached on each of the sheets fixed television in such a manner that two polarizing axes of the polarizing plates intersected at right angles. Thus, a color liquid crystal display was prepared.

EXAMPLE 9

Preparation of Liquid Crystal Display

The procedures of Example 8 were repeated except for using the optical compensatory sheet (RF-2) obtained in Example 2 instead of the optical compensatory sheet (RF-1), to prepare a color liquid crystal display.

EXAMPLE 10

Preparation of Liquid Crystal Display

The procedures of Example 8 were repeated except for using the optical compensatory sheet (RF-3) obtained in Example 3 instead of the optical compensatory sheet (RF-1), to prepare a color liquid crystal display.

EXAMPLE 11

Preparation of Liquid Crystal Display

The procedures of Example 8 were repeated except for using the optical compensatory sheet (RF-4) obtained in Example 4 instead of the optical compensatory sheet (RF-1), to prepare a color liquid crystal display.

EXAMPLE 12

Preparation of Liquid Crystal Display

The procedures of Example 8 were repeated except for using the optical compensatory sheet (RF-5) obtained in Example 5 instead of the optical compensatory sheet (RF-1), to prepare a color liquid crystal display.

EXAMPLE 13

Preparation of Liquid Crystal Display

The procedures of Example 8 were repeated except for using the optical compensatory sheet (RF-6) obtained in Example 6 instead of the optical compensatory sheet (RF-1), to prepare a color liquid crystal display.

EXAMPLE 14

Preparation of Liquid Crystal Display

The procedures of Example 8 were repeated except for using the optical compensatory sheet (RF-7) obtained in Example 7 instead of the optical compensatory sheet (RF-1), to prepare a color liquid crystal display.

COMPARISON EXAMPLE 2

Preparation of Liquid Crystal Display

The procedures of Example 8 were repeated except for using the optical compensatory sheet (RF-8) obtained in Comparison Example 1 instead of the optical compensatory sheet (RF-1), to prepare a color liquid crystal display.

[Evaluation of Color Liquid Crystal Display]

White image and black image were displayed using the obtained color liquid crystal displays. In the display, transmittances (T) were measuredly varying viewing angle using a spectrophotometer (LCD-5000, available from Otsuka Electronics Co., Ltd.). From the measured data, the angle against the normal at which the contrast (white/black) on a black-and-white display showed 10 was defined as viewing angle and the viewing angles in a height (upper-lower) direction and a width (left-right) direction of the display were determined.

As a result, all the displays obtained in the Examples 8-14 and Comparison Example 2 showed a viewing angle in a height (upper-lower) direction of 90 degrees and a width (left-right) direction of 115 degrees. The display obtained in Comparison Example 2 had locally poor image while all the displays obtained in the Examples 8-14 did not show such an image.

What is claimed is:

1. A rectangular optical compensatory sheet having a shorter side of not less than 14 cm which comprises a transparent support, an orientation layer provided thereon and an optically anisotropic layer provided on the orientation layer, the optically anisotropic layer comprising a compound having one or more discotic structure units in its molecule, and whose variation of retardation in overall area is within X±5 nm wherein X is in the range of 0 to 100 nm, the retardation being represented by the formula:

(nx−ny)×d in which nx and ny are main refractive indices on the plane of the sheet and d is the thickness of the sheet in terms of nm.

2. The rectangular optical compensatory sheet as defined in claim 1, wherein the discotic structure units have planes inclined from a plane of the support at angles varying along a direction of depth of the optically anisotropic layer.

3. The rectangular optical compensatory sheet as defined in claim 1, wherein the shorter side are in the range of 14 to 150 cm.

4. The rectangular optical compensatory sheet as defined in claim 1, wherein the side other than the shorter side is in the range of 21 to 210 cm.

5. The rectangular optical compensatory sheet as defined in claim 1, which has the minimum absolute retardation value in a direction inclined from the normal of the sheet, the minimum value being other than zero.

6. The rectangular optical compensatory sheet as defined in claim 1, wherein the transparent support has a negative uniaxial property and its optic axis in a direction of the normal of the support, and satisfies the condition of:

$20 \leq \{(nx^1+ny^1)/2-nz^1\} \times d \leq 400$ in which $nx^1$ and $ny^1$ are main refractive indices on the plane of the support, $nz^1$ is a main refractive index in a thickness direction of the support and $d^1$ is the thickness of the support in terms of nm.

7. A process for the preparation of the optical compensatory sheet of claim 1 comprising the steps of:

coating a coating liquid of a discotic compound in a solvent containing a liquid of a boiling point of not lower than 100° C. on an orientation layer which is provided on a continuous transparent support having a width of 15 to 150 cm and a length of than 50 to 3,000 m, with moving the transparent support in the length direction, by the use of a bar coater or extrusion coater, to form a coated layer;

drying the coated layer by applying a gas of a rate of 0.1 to 10 m/sec. and a temperature of 20° to 50° C. to a surface of the coated layer;

heating the coated layer to form a discotic nematic phase;

cooling the coated layer to give an optically anisotropic layer; and cutting the continuous transparent support having the orientation layer and the optically anisotropic layer to give a rectangular optical compensatory sheet having a shorter side of not less than 14 cm.

8. A process for the preparation of an optical compensatory sheet of claim 1 comprising the steps of:

coating a coating liquid of a discotic compound and fluorine atom- or silicone atom-containing surfactant in a solvent on an orientation layer which is provided on a continuous transparent support having a width of 15 to 150 cm and a length of 50 to 3,000 m, with moving the transparent support in the length direction, by the use of a bar coater or extrusion coater, to form a coated layer;

drying the coated layer by applying a gas of a rate of 0.1 to 10 m/sec. and a temperature of 20° to 50° C. to a surface of the coated layer;

heating the coated layer to form a discotic nematic phase;

cooling the coated layer to give an optically anisotropic layer; and cutting the continuous transparent support having the orientation layer and the optically anisotropic layer to give a rectangular optical compensatory sheet having a shorter side of not less than 14 cm.

9. A liquid crystal display comprising a liquid crystal cell which comprises a pair of substrates each of which is provided with a transparent electrode and twisted nematic liquid crystal sealed therebetween, a polarizing sheet arranged on each side of the liquid crystal cell, and the optical compensatory sheet of claim 1 provided between at least one side of the liquid crystal cell and the polarizing sheet.

10. A color liquid crystal display comprising a liquid crystal cell which comprises a pair of substrates provided with a transparent electrode, a transparent electrode of picture element and color filter, and twist-oriented nematic liquid crystal sealed between the substrates, a pair of polarizing sheets arranged on both sides of the cell, and the optical compensatory sheet of claim 1 provided between the liquid crystal cell and the polarizing sheet.

11. A rectangular optical compensatory sheet having a shorter side of not less than 14 cm which comprises an optically anisotropic layer comprising a compound having one or more discotic structure units in its molecule, and whose variation of retardation in overall area is within X±5 nm wherein X is in the range of 0 to 100 nm, the retardation being represented by the formula:

(nx−ny)×d in which nx and ny are main refractive indices on the plane of the sheet and d is the thickness of the sheet in terms of nm.

* * * * *